Patented Feb. 21, 1933

1,898,446

UNITED STATES PATENT OFFICE

RICHARD HERZ, OF FRANKFORT-ON-THE-MAIN, AND MAX SCHUBERT AND WILHELM HECHTENBERG, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

NEW DYESTUFFS CONTAINING SULPHUR

No Drawing. Application filed February 1, 1932, Serial No. 590,310, and in Germany March 23, 1931.

Our present invention relates to new dyestuffs containing sulphur.

In U. S. specification Serial No. 590,309 applied for by Richard Herz and Max Schubert and filed on the same date, new indophenols of the benzocarbazole series are described which correspond to the general formula

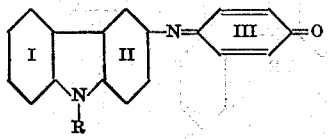

wherein two adjacent hydrogen atoms of the nuclei I or II or I and II are replaced by the benzo nucleus

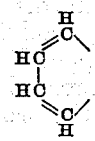

R means hydrogen or alkyl and all nuclei may contain as substituents methyl, methoxy, chlorine, hydroxy or a sulphonic acid group.

According to the present invention these indophenols or their leuco compounds are treated with sulphurizing agents, especially with an alcoholic polysulphide solution of a high content of sulphur.

New dyestuffs containing sulphur are thereby obtained which dye vegetable fibers from the sodium sulphide bath or from the vat greenish blue to green shades of good fastness. By this greenish tint the new dyestuffs are distinguished from the sulphurized products of the indophenols of the carbazole series.

When the sulphurizing reaction is conducted in the presence of a suitable metal or metal salt, say copper or a copper salt, dyestuffs are obtained exhibiting shades to higher degree inclined to green, whereas the analogous dyestuffs of the carbazole series yield under these conditions black dyestuffs.

In order to further illustrate our invention the following examples are given the parts being by weight and all temperatures in centigrade degrees, but we wish it however to be understood that our invention is not limited to the particular products nor reacting conditions mentioned therein.

Example 1

10 parts of the leuco-indophenol of the probable formula

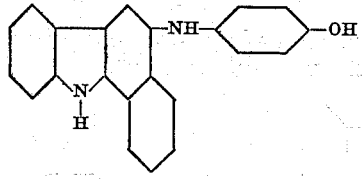

are boiled for 50–70 hours in an apparatus provided with a reflux condenser with an alcoholic polysulphide prepared from 10 parts of concentrated sodium sulphide, 12 parts of sulphur and 50 parts of alcohol. When the reaction is finished the alcohol is distilled off. The residue is freed from sulphur in the usual manner, washed and dried.

The dyestuff thus obtained dissolves in concentrated sulphuric acid with a pure blue color. It dyes cotton from the hydrosulphite vat greenish blue shades. A similar, but more greenish dyestuff is obtained by adding a copper salt to the mass.

Example 2

When the leuco-indophenol of the 9-ethyl-1.2-benzocarbazole of the probable formula

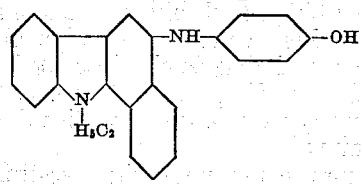

is subjected to the sulphurizing process of

Example 1 a dyestuff is obtained, dyeing cotton from the sodium sulphide bath pure green shades.

The N-methyl-homologues yields a similar dyestuff.

*Example 3*

10 parts of the leuco-indophenol corresponding to the probable formula

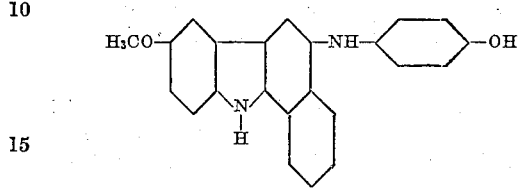

are boiled for about 50 hours in an apparatus provided with a reflux condenser with an alcoholic polysulphide solution, prepared from 17 parts of concentrated sodium sulphide, 22.5 parts of sulphur and 100 parts of ethanol with the addition of 2.7 parts of copper sulphide. When the reaction is finished the ethanol is distilled off. The residue is freed from sulphur in the usual manner, washed and dried. The dyestuff thus obtained dissolves in concentrated sulphuric acid with a pure blue color and dyes cotton from the sodium sulphide bath blue-green shades.

*Example 4*

10 parts of the leuco-indophenol-sulphonic acid of the probable formula

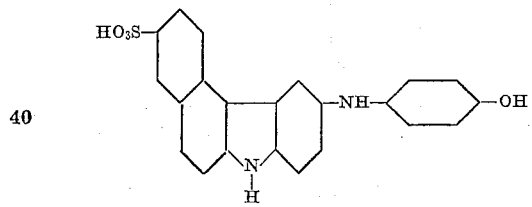

20 parts of crystallized sodium sulphide, 9 parts of sulphur, 10 parts of water and 5 parts of crystallized copper sulphate are concentrated by evaporation until a melting point of 107° and then boiled for 30 hours in an apparatus provided with a reflux condenser. The melting is diluted with water and after the addition of 4 parts of crystallized sodium sulphide the separated dyestuff is filtered, washed, acidified and dried.

The dyestuff obtained in this manner dissolves in concentrated sulphuric acid with a dark-green color. It dyes cotton from the sodium sulphide bath bluish black shades.

In an analogous manner the other indophenols or leuco-indophenols described in the aforesaid copending application may be converted into corresponding greenish dyestuffs.

We claim:

1. As new compounds the dyestuffs containing sulphur, prepared by treating an indophenol of the benzocarbazole series of the general formula

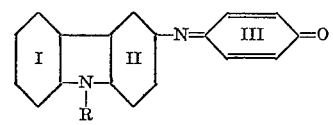

(wherein two adjacent hydrogen atoms of the nuclei I or II or I and II are replaced by the benzo nucleus

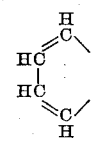

R means hydrogen or alkyl and all nuclei may contain as substituents methyl, methoxy, chlorine, hydroxy or a sulphonic acid group) with sulphurizing agents in the presence of copper, which compounds dye from the sodium sulphide bath or from the vat greenish blue to green shades of a good fastness.

2. As new compounds the dyestuffs containing sulphur, prepared by treating a leuco-indophenol of the probable formula

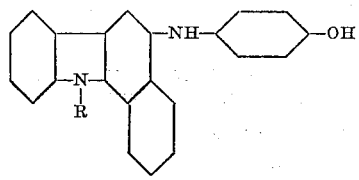

(wherein R means hydrogen or ethyl) with sulphurizing agents in the presence of copper which compounds dye from the sodium sulphide bath or from the vat greenish blue to green shades of a good fastness.

3. As a new compound the dyestuff containing sulphur, prepared by treating the leuco-indophenol of the probable formula

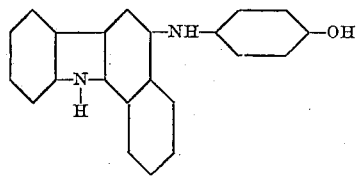

with sulphurizing agents in the presence of copper which compound dyes from the hydrosulphite vat greenish blue shades.

4. As a new compound the dyestuff containing sulphur, prepared by treating the leuco-indophenol of the probable formula

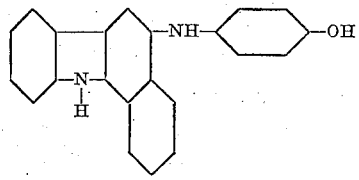

with sulphurizing agents which compound dyes from the hydrosulphite vat bluish green shades.

5. As a new compound the dyestuff containing sulphur, prepared by treating the leuco-indophenol of the probable formula
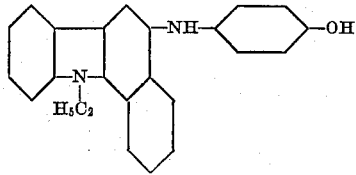
with sulphurizing agents which compound dyes from the sodium sulphide bath pure green shades.
In testimony whereof, we affix our signatures.
RICHARD HERZ.
MAX SCHUBERT.
WILHELM HECHTENBERG.